(12) United States Patent
Ishikawa

(10) Patent No.: US 10,025,706 B2
(45) Date of Patent: Jul. 17, 2018

(54) CONTROL DEVICE, STORAGE DEVICE, AND STORAGE CONTROL METHOD

(71) Applicant: Tessera Advanced Technologies, Inc., San Jose, CA (US)

(72) Inventor: Yuya Ishikawa, Kanagawa (JP)

(73) Assignee: Tessera Advanced Technologies, Inc., San Jose, CA (US)

( * ) Notice: Subject to any disclaimer, the term of this patent is extended or adjusted under 35 U.S.C. 154(b) by 0 days.

(21) Appl. No.: 15/436,588

(22) Filed: Feb. 17, 2017

(65) Prior Publication Data

US 2017/0249245 A1    Aug. 31, 2017

Related U.S. Application Data

(63) Continuation of application No. 13/867,770, filed on Apr. 22, 2013, now Pat. No. 9,575,883.

(30) Foreign Application Priority Data

May 1, 2012   (JP) .................. 2012-104459

(51) Int. Cl.
  *G06F 12/00*  (2006.01)
  *G06F 13/00*  (2006.01)
  *G06F 13/28*  (2006.01)
  *G06F 12/02*  (2006.01)

(52) U.S. Cl.
  CPC ................. *G06F 12/0246* (2013.01)

(58) Field of Classification Search
  CPC .................................... G06F 12/0246
  USPC ......................................... 711/103
  See application file for complete search history.

(56) References Cited

U.S. PATENT DOCUMENTS

2010/0070735 A1 *  3/2010  Chen .................. G06F 12/0246
                                                             711/206

* cited by examiner

*Primary Examiner* — Edward Dudek, Jr.
*Assistant Examiner* — Sidney Li

(57) ABSTRACT

A control device includes: a management information generation unit configured to generate or update logical-physical block address management information with respect to either data to be written to a non-volatile memory or data which has been already written in the non-volatile memory, the logical-physical block address management information indicating association between a logical block address and a physical block address on the non-volatile memory; and an access control unit configured to, during write of the data to the non-volatile memory, control write of the data as well as the logical-physical block address management information to a physical write unit of the non-volatile memory.

9 Claims, 9 Drawing Sheets

FIG. 2

| PB0 | PP0 | PP1 | PP2 | ... | PP13 | PP14 | PP15 |
|---|---|---|---|---|---|---|---|
| PB1 | PP0 | PP1 | PP2 | ... | PP13 | PP14 | PP15 |
| ⋮ | | | | ⋮ | | | |
| PB(n-1) | PP0 | PP1 | PP2 | ... | PP13 | PP14 | PP15 |
| PBn | PP0 | PP1 | PP2 | ... | PP13 | PP14 | PP15 |

FIG. 3A

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx { 1 | 1 | 1000 | 3000 | 2500 | 5 | 9 | 100 | 100 | 9 | 120 | 1500 | 3000 | 2500 | 14 | 99 |
| 2 | 2 | 1001 | 3001 | 2501 | 6 | 10 | 101 | 101 | 10 | 121 | 1501 | 3001 | 2501 | 15 | 100 |
| 3 | 3 | 1002 | 3002 | 2502 | 7 | 11 | 102 | 102 | 11 | 122 | 1502 | 3002 | 2502 | 16 | 101 |
| 4 | 4 | 1003 | 3003 | 2503 | 8 | 12 | 103 | 103 | 12 | 123 | 1503 | 3003 | 2503 | 17 | 102 |

FIG. 3B

| LBA | PHYSICAL PAGE |
|---|---|
| 1 | 1 |
| 5 | 5 |
| 9 | 9 |
| 14 | 14 |
| 99 | 15 |
| 100 | 8 |
| 120 | 10 |
| 1000 | 2 |
| 1500 | 11 |
| 2500 | 13 |
| 3000 | 12 |

FIG. 3C

| LBA | PHYSICAL PAGE | PHYSICAL BLOCK |
|---|---|---|
| 1 | 1 | x |
| 5 | 5 | x |
| 9 | 1 | x+1 |
| 14 | 14 | x |
| 99 | 15 | x |
| 100 | 8 | x |
| 120 | 10 | x |
| 1000 | 2 | x |
| 1500 | 11 | x |
| 2500 | 13 | x |
| 3000 | 12 | x |

FIG. 6A

| PP → | 0 | 1 | 2 | 3 | 4 | 5 | 6 | 7 | 8 | 9 | 10 | 11 | 12 | 13 (PPe) | 14 | 15 |
|---|---|---|---|---|---|---|---|---|---|---|---|---|---|---|---|---|
| PBx 1 | 1 | 1 | 1000 | 3000 | 2500 | 5 | 9 | 100 | 100 | 9 | 120 | 1500 | 3000 | 2500 | | |
| 2 | 2 | 1001 | 3001 | 2501 | 6 | 10 | 101 | 101 | 10 | 121 | 1501 | 3001 | 2501 | | | |
| 3 | MGT | 1002 | MGT | 2502 | MGT | MGT | MGT | MGT | 11 | 122 | MGT | MGT | MGT | | | |
| 4 | MGT | 1003 | MGT | 2503 | MGT | MGT | MGT | MGT | 12 | 123 | MGT | MGT | MGT | | | |

DIRECTION IN WHICH PAGES ARE USED →

FIG. 6B

| PP → | 0 | 1 | 2 | 3 | 4 | 5 | 6 | 7 | 8 | 9 | 10 | 11 | 12 | 13 (PPe) | 14 | 15 |
|---|---|---|---|---|---|---|---|---|---|---|---|---|---|---|---|---|
| PBx 1 | 1 | 1 | 1000 | 3000 | 2500 | 5 | 9 | 100 | 100 | 9 | 120 | 1500 | 3000 | 2500 | | |
| 2 | 2 | 1001 | 3001 | 2501 | 6 | 10 | 101 | 101 | 10 | 121 | 1501 | 3001 | 2501 | | | |
| 3 | MGT | 1002 | MGT | 2502 | MGT | MGT | MGT | MGT | 11 | 122 | MGT | MGT | MGT | | | |
| 4 | MGT | 1003 | MGT | 2503 | MGT | MGT | MGT | MGT | 12 | 123 | MGT | MGT | MGT | | | |

| PP → | 0 | 1 | 2 | 3 | 4 | 5 | 6 | 7 | 8 | 9 | 10 | 11 | 12 | 13 (PPe) | 14 | 15 |
|---|---|---|---|---|---|---|---|---|---|---|---|---|---|---|---|---|
| PBx 1 | 1 | 1 | 1000 | 3000 | 2500 | 5 | 9 | 100 | 100 | 9 | 120 | 1500 | 3000 | 2500 | 14 | |
| 2 | 2 | 1001 | 3001 | 2501 | 6 | 10 | 101 | 101 | 10 | 121 | 1501 | 3001 | 2501 | 15 | | |
| 3 | MGT | 1002 | MGT | 2502 | MGT | MGT | MGT | MGT | 11 | 122 | MGT | MGT | MGT | 16 | | |
| 4 | MGT | 1003 | MGT | 2503 | MGT | MGT | MGT | MGT | 12 | 123 | MGT | MGT | MGT | 17 | | |

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | | | | | | | | | | | | | | | |
| | 2 | | | | | | | | | | | | | | | |
| | MGT | | | | | | | | | | | | | | | |
| | MGT | | | | | | | | | | | | | | | |

↑ DMW

FIG. 7B

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | | | | | | | | | | | | | | |
| | 2 | 4 | | | | | | | | | | | | | | |
| | MGT | MGT | | | | | | | | | | | | | | |
| | MGT | MGT | | | | | | | | | | | | | | |

↑ DMW

FIG. 7C

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | | | | | | | | | | | | | |
| | 2 | 4 | 6 | | | | | | | | | | | | | |
| | MGT | MGT | MGT | | | | | | | | | | | | | |
| | MGT | MGT | MGT | | | | | | | | | | | | | |

↑ DMW

FIG. 7D

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | 7 | | | | | | | | | | | | |
| | 2 | 4 | 6 | 8 | | | | | | | | | | | | |
| | MGT | MGT | MGT | MGT | | | | | | | | | | | | |
| | MGT | MGT | MGT | MGT | | | | | | | | | | | | |

↑ DMW

FIG. 7E

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | 7 | 9 | | | | | | | | | | | |
| | 2 | 4 | 6 | 8 | 10 | | | | | | | | | | | |
| | MGT | MGT | MGT | MGT | 11 | | | | | | | | | | | |
| | MGT | MGT | MGT | MGT | 12 | | | | | | | | | | | |

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx { | 1 | 3 | 5 | 7 | 9 | | | | | | | | | | | |
| | 2 | 4 | 6 | 8 | 10 | | | | | | | | | | | |
| | | | | | MGT | | | | | | | | | | | |
| | | | | | MGT | | | | | | | | | | | |

↑ DMW

FIG. 8B

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx { | 1 | 3 | 5 | 7 | 9 | 21 | 23 | | | | | | | | | |
| | 2 | 4 | 6 | 8 | 10 | 22 | 24 | | | | | | | | | |
| | | | | | MGT | | | | | | | | | | | |
| | | | | | MGT | | | | | | | | | | | |

FIG. 8C

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx { | 1 | 3 | 5 | 7 | 9 | 21 | 23 | 31 | 33 | | | | | | | |
| | 2 | 4 | 6 | 8 | 10 | 22 | 24 | 32 | 34 | | | | | | | |
| | | | | | MGT | | | | | | | | | | | |
| | | | | | MGT | | | | | | | | | | | |

FIG. 8D

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx { | 1 | 3 | 5 | 7 | 9 | 21 | 23 | 31 | 33 | 35 | | | | | | |
| | 2 | 4 | 6 | 8 | 10 | 22 | 24 | 32 | 34 | 36 | | | | | | |
| | | | | | MGT | | | | | MGT | | | | | | |
| | | | | | MGT | | | | | MGT | | | | | | |

↑ DMW

FIG. 9A

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | | | | | | | | | | | | | |
| | 2 | 4 | 6 | | | | | | | | | | | | | |
| | | | | | | | | | | | | | | | | |
| | | | | | | | | | | | | | | | | |

FIG. 9B

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | 7 | 9 | | | | | | | | | | | |
| | 2 | 4 | 6 | 8 | 10 | | | | | | | | | | | |
| | | | | | | | | | | | | | | | | |
| | | | | | | | | | | | | | | | | |

FIG. 9C

| PP → | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| PBx | 1 | 3 | 5 | 7 | 9 | 21 | | | | | | | | | | |
| | 2 | 4 | 6 | 8 | 10 | 22 | | | | | | | | | | |
| | | | | | | MGT | | | | | | | | | | |
| | | | | | | MGT | | | | | | | | | | |

↑ DMW

… …

CONTROL DEVICE, STORAGE DEVICE, AND STORAGE CONTROL METHOD

CROSS REFERENCES TO RELATED APPLICATIONS

The present application claims priority to Japanese Priority Patent Application JP 2012-104459 filed in the Japan Patent Office on May 1, 2012, the entire content of which is hereby incorporated by reference.

BACKGROUND

The present disclosure relates to a control device, storage device, and storage control method and in particular to processing of management information for logical-to-physical block address conversion.

Storage devices using a non-volatile memory, such as a NAND flash memory, are being widely used. A non-volatile memory is being used in memory cards, solid state drives (SSDs), embedded multimedia cards (eMMCs), and the like used in, for example, electronic devices, information processing devices, and the like.

Japanese Unexamined Patent Application Publication Nos. 2009-70098, 2007-334852, 2007-193838, and 2007-58840 disclose storage devices using a flash memory.

In a non-volatile memory, physical block addresses (PBAs) are used as the addresses of physical storage areas. A physical block address is composed of a physical block, a physical page, and a physical sector. Multiple physical sectors form a physical page, and multiple physical pages form a physical block.

While erase is performed on a physical block basis, write (program) and read can be performed on a physical page basis.

The host or memory control unit specifies an address using a logical block address (LBA). A logical block address composed of a logical block and a logical page is associated with the above-mentioned physical block address. Thus, when access is requested, a logical block address is converted into a physical block address, so that access is actually made to the flash memory.

SUMMARY

As seen above, in a storage device using a NAND flash memory as a storage device, a logical block address specified by the host device has to be converted into a physical block address indicating the physical page of the physical block on the flash memory to which data corresponding to the logical block address is to be written.

Accordingly, management information for performing this conversion has to be constructed. However, when access to data of small size is requested by the host or when data having a non-sequential LBA is frequently accessed, pieces of data are less likely to sequentially exist in a physical block. Accordingly, it would take time to construct management information. This would result in a reduction in the speed of the system.

Accordingly, it is desirable to, for example, even if data having a non-sequential address is written frequently, efficiently and properly construct and store information necessary for logical-to-physical block address conversion, thereby increasing the performance of memory operation.

A control device according to the present disclosure includes: a management information generation unit configured to generate or update logical-physical block address management information with respect to either data to be written to a non-volatile memory or data which has been already written in the non-volatile memory, the logical-physical block address management information indicating association between a logical block address and a physical block address on the non-volatile memory; and an access control unit configured to, during write of the data to the non-volatile memory, control write of the data as well as the logical-physical block address management information to a physical write unit of the non-volatile memory.

A storage device according to the present disclosure includes the control device and the non-volatile memory.

A storage control method according to the present disclosure includes: generating or updating logical-physical block address management information with respect to either data to be written to a non-volatile memory or data which has been already written in the non-volatile memory, the logical-physical block address management information indicating association between a logical block address and a physical block address on the non-volatile memory; and during write of the data to the non-volatile memory, controlling write of the data as well as the logical-physical block address management information to a physical write unit of the non-volatile memory.

In the present disclosure, the logical-physical block address management information is written to the physical write unit (e.g., physical page) along with the data. Further, in writing the data to the non-volatile memory, the logical-physical block address management information is updated in accordance with the data to be written, or the logical-physical block address management information is updated with respect to data which is already stored in the non-volatile memory.

This logical-physical block address management information can be used both to make normal access to write data to a physical write unit and to make normal access to read data therefrom.

According to the present disclosure, it is possible to efficiently and properly construct and store information necessary for logical-to-physical block address conversion, thereby increasing the performance of memory operation.

Additional features and advantages are described herein, and will be apparent from the following Detailed Description and the figures.

BRIEF DESCRIPTION OF THE FIGURES

FIG. 2 is a diagram showing physical blocks and physical pages in a non-volatile memory according to the present embodiment;

FIGS. 3A to 3C are diagrams showing logical-physical block address management information (management table) according to the present embodiment;

FIGS. 6A to 6C are diagrams showing reading of a management table according to the present embodiment;

FIGS. 7A to 7E are diagrams showing the write timing of a management table according to the present embodiment;

FIGS. 8A to 8D are diagrams showing the write timing of a management table to which a write occasion number condition is added according to the present embodiment; and FIGS. 9A to 9C are diagrams showing the write timing of a management table to which an address sequence condition is added according to the present embodiment.

DETAILED DESCRIPTION

Figure 1:
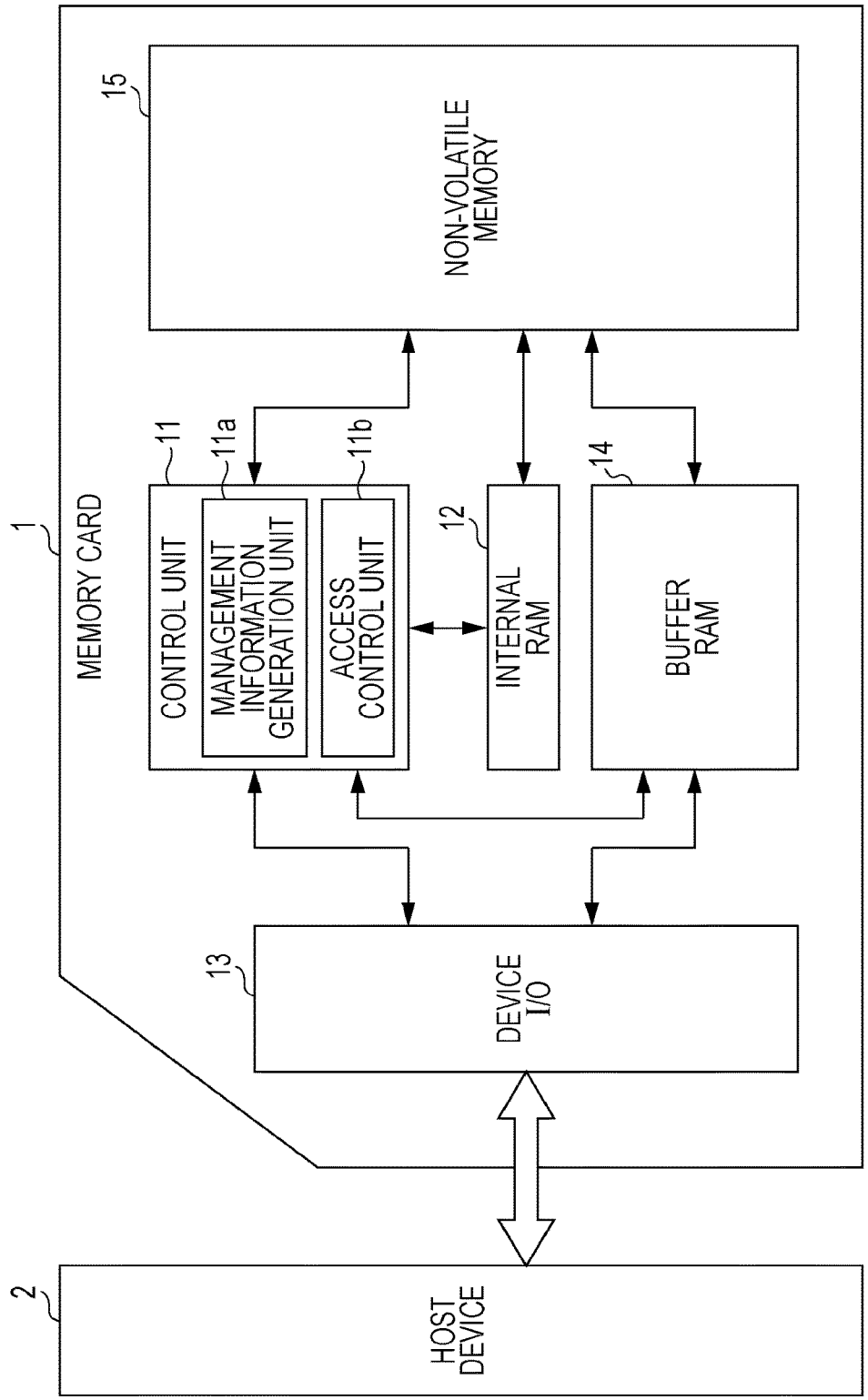
FIG. 1 is a block diagram of a memory card according to an embodiment of the present disclosure.

Now, an embodiment will be described in the following order. A memory card 1 according to the present embodiment corresponds to a storage device in claims. A control unit 11 in the memory card 1 corresponds to a control device in claims. A storage control process performed by the control unit 11 corresponds to a storage control method in claims.
1. Configuration of memory card
2. Logical-physical block address management information (management table)
3. Data write control process/management table construction process
4. Management table write occasion
5. Modifications
   1. Configuration of Memory Card
   FIG. 1 shows an example configuration of the memory card 1 according to the present embodiment.

The memory card 1 is connected to a host device 2 and used as a storage device. Conceivable examples of the host device 2 include various types of electronic devices and information processing devices, including personal computers, digital still cameras, video cameras, audio players, video players, game machines, mobile phones, and information terminals such as personal digital assistants (PDAs).

The memory card 1 includes a control unit 11, an internal random access memory (RAM) 12, a device interface 13, a buffer RAM, and a non-volatile memory 15.

The control unit 11 is a central processing unit (CPU) and controls the entire memory card 1. For this reason, the control unit 11 sequentially executes instruction code loaded in an internal RAM 12. Primarily, in response to a command from the host device 2, the control unit 11 causes the other components to write or read data. For this reason, the control unit 11 controls data transmission or data reception of the device interface 13 to or from the host device 2, write or read of data to or from a buffer RAM 14, and access to the non-volatile memory 15.

The internal RAM 12 is, for example, a static random access memory (SRAM) and stores a program (firmware) to be executed by the control unit 11 or is used as a work area.

The device interface 13 communicates with the host device 2.

The buffer RAM 14 is used to buffer data transmitted from or to the host device 2 (write data or read data).

The non-volatile memory 15 is, for example, a NAND flash memory.

In data write, the memory card 1 basically receives, from the host device 2, a write request, as well as a write address (logical block address), a data size, and data to be written.

The write data sent from the host device 2 is received by the device interface 13 and buffered in the buffer RAM 14. The data is then written to the non-volatile memory 15 under the control of the control unit 11. The control unit 11 controls these operations in accordance with the write request, write address, and data size.

In data read, the memory card 1 receives, from the host device 2, a read request, as well as a read address (logical block address) and a data size. The control unit 11 reads the requested data from the non-volatile memory 15 in accordance with the read address and data size and buffers the data in the buffer RAM 14. The control unit 11 also performs an error correction process or the like on the buffered read data. The read data is then transferred from the buffer RAM 14 to the device interface 13 and then transmitted to the host device 2.

In the non-volatile memory 15, a physical block address is used as the address of a physical storage area. For this reason, physical blocks, physical pages, and physical sectors are set in the non-volatile memory 15. Multiple physical sectors form a physical page, and multiple physical pages form a physical block.

FIG. 2 schematically shows n+1 number of physical blocks, PB0 to PBn. While each physical block PB is composed of 16 physical pages PP (PP0 to PP15) as an example herein, this is illustrative only.

A single physical page PP is, for example, 16 Kbytes in size. Each physical page PP is divided into multiple physical sectors (not shown).

While erase is performed on a physical block basis, write (program) and read can be performed on a physical page basis. That is, a physical block serves as a unit for physical erase, and a physical page serves as a unit for physical write.

The host device 2 specifies an address using a logical block address. A logical block address composed of a logical block, a logical page, and a logical sector is associated with the above-mentioned physical block address. That is, the control unit 11 generates logical-physical block address management information where logical block addresses and physical block addresses are associated with each other and, upon receipt of an access request from the host device 2, refers to the logical-physical block address management information to convert a specified logical block address into a physical block address. Using the physical block address obtained, the control unit 11 actually accesses the non-volatile memory 15.

In the present embodiment, as shown in FIG. 1, the control unit 11 includes a management information generation unit 11*a* and an access control unit 11*b* as functions for performing operations to be discussed later (processing functions achieved by software).

The management information generation unit 11*a* generates or updates logical-physical block address management information indicating the association between logical block addresses and physical block addresses (hereafter referred to as "management table").

The access control unit 11*b* controls access to the non-volatile memory 15 for data write or data read requested by the host device 2. The access control unit 11*b* also controls write or read of a management table to or from the non-volatile memory 15.

While these function units are provided as software functions generated when the CPU 11 performs a process, they may be formed as hardware functions.

A management table generated or updated by the management information generation unit 11*a* is stored in, for example, the internal RAM 12 under the control of the control unit 11.

In the present embodiment, pieces of data having non-sequential logical block addresses are allowed to be written to sequential physical pages PP of a physical block PB. Hereafter, data whose write or read is requested by the host device 2 (data managed by the host device 2 using a logical block address) will be referred to as "host data."

One typical related-art data write method is a method of writing pieces of host data to a physical block PB in such a manner that the respective logical block addresses are sequential. Thus, in acquiring information on host data written in the physical block PB next time, it is possible to know over what range the logical block addresses of pieces of host data stored in the physical block PB extend by finding the last used physical page PP in the physical block PB and then reading logical block address information of host data written in a redundant area of the physical page PP found. That is, in this way, the control unit 11 can grasp the association between the logical block addresses and the physical block addresses with respect to this physical block PB.

However, in this method, the logical block address of host data to be written to the physical block PB usually has to be sequential. Accordingly, it is difficult to efficiently use the physical block PB in a case where the host device 2 writes host data having a non-sequential logical block address or in a case where it updates already written host data having a logical block address. In these cases, there frequently occurs so-called "garbage collection," where host data is copied from one physical block, PBx, to another physical block, PBy, so that logical block addresses become sequential in the physical block PB. This would result in significant reductions in device life and write speed.

Another data write method is a method of allowing host data having a non-sequential logical block address to be sequentially written to a physical block PB.

In this case, even when write of host data having a non-sequential address or rewrite of already stored host data having a logical block address is requested, such a request can be met without having to perform garbage collection. That is, it is only necessary to write host data whose write is requested, to a physical page PP subsequent to the last used physical page in the physical block PB.

However, to know the association between the logical block addresses and physical block addresses of pieces of host data stored in this physical block PB, the control unit 11 has to construct association information (that is, logical-physical block address management information) by reading all data-written physical pages PP of the physical block PB and then acquiring logical block address information written in the redundant area of each physical page PP. This would result in significant reductions in the write and read speeds of host data.

In the present embodiment, there is employed the method of allowing host data having a non-sequential logical block address to be sequentially written to a physical block PB. This can advantageously reduce garbage collection occasions described above.

Further, in the present embodiment, when a request to write data is made by the host device 2, a management table is written to the same physical page as that in which the host data is written. As a result, it is possible to efficiently and quickly perform an operation for generating or updating a management table (logical-physical block address management information), thereby increasing the speed of access, which is write or read of host data.

Specifically, the management information generation unit 11a of the control unit 11 generates or updates a management table indicating the association between the logical block address and physical block address of host data to be written to the non-volatile memory 15 or host data already written therein.

In writing the host data to the non-volatile memory 15, the access control unit 11b controls write of the host data as well as the management table to a physical page of the non-volatile memory 15.

In particular, when the combined data amount of the host data and management table to be written falls within the capacity of the physical page PP of the non-volatile memory, the access control unit controls write of the host data and management table to the physical page PP.

Further, in the construction of the management table, the access control unit 11b sequentially checks the physical pages PP in the physical block PB, starting with the last used physical page PP toward the top physical page PP, for whether each physical page PP contains a management table. The access control unit 11b then acquires a management table which has been found first.

When the management table acquired by the access control unit 11b is not a management table which is stored in the last used physical page PP, the management information generation unit 11a updates the management table using logical block address information of the checked physical pages PP (physical pages PP containing no management table).

2. Logical-Physical Block Address Management Information (Management Table)

FIGS. 3A to 3C show an example of a management table.

FIG. 3A shows the storage state of physical pages PP0 to PP15 of a physical block PBx.

Assume that a single physical page PP is 16 Kbytes in size. Also assume that host data is provided with a logical block address having a size of 4 Kbytes. The numerical values in the frames of the diagram represent logical block addresses (LBAs).

In the example shown in this diagram, pieces of host data having logical block addresses "1", "2", "3", and "4" are stored in the physical page PP0 and subsequently the pieces of host data having logical block addresses "1", "2", "3", and "4" are rewritten in the physical page PP1. That is, the latest pieces of host data having logical block addresses "1", "2", "3", and "4" are stored in the physical page PP1.

Stored in the physical page PP2 are pieces of host data having logical block addresses "1000", "1001", "1002", and "1003".

Pieces of host data having logical block addresses "3000", "3001", "3002", and "3003" are written in the physical page PP3, and at a later point in time, the updated pieces of host data having logical block addresses "3000", "3001", "3002", and "3003" are written in the physical page PP12.

A management table corresponding to the storage state shown in FIG. 3A is a table where logical block addresses (LBAs) and physical pages PP are associated with each other, as shown in FIG. 3B.

For example, FIG. 3B shows that the latest pieces of host data having logical block addresses "1", "2", "3", and "4" having the logical block address "1" as the top are stored in the physical page PP1.

FIG. 3B also shows that the latest pieces of host data having logical block addresses "5", "6", "7", and "8" having the logical block address "5" as the top are stored in the physical page PP5.

FIG. 3B also shows that the latest pieces of host data having logical block addresses "9", "10", "11", and "12" having the logical block address "9" as the top are stored in the physical page PP9.

Similarly, the association between other stored logical block addresses and physical pages is managed. For example, the latest pieces of host data having logical block addresses "3000", "3001", "3002", and "3003" are stored in the physical page PP12.

As seen above, information indicating the association between physical pages PP and the logical block addresses of pieces of host data stored in the physical pages PP is stored in a management table.

Individual pieces of association information entered in a management table will be referred to as "logical-physical association data" for the sake of convenience.

By constructing such a management table with respect to, for example, a physical block PBx, the control unit 11 can grasp the physical page PP in which host data specified by the host device 2 using a logical block address is stored.

As shown in FIG. 3C, physical block numbers may be further associated with LBAs and physical pages in a management table.

A management table for a physical block PB does not necessarily have to be stored in that physical block PB and may be written in a physical page PP of another physical block PB. In such a case, as shown in FIG. 3C, it is appropriate to manage physical block numbers and physical page numbers in a manner corresponding to logical block addresses.

3. Data Write Control Process/Management Table Construction Process

A specific example of the processes performed by the control unit 11 will be described with reference to FIGS. 4 and 5. Note that the processes shown in FIGS. 4 and 5 are processes performed by the control unit 11 having the functions of the management information generation unit 11a and the access control unit 11b.

Figure 4:
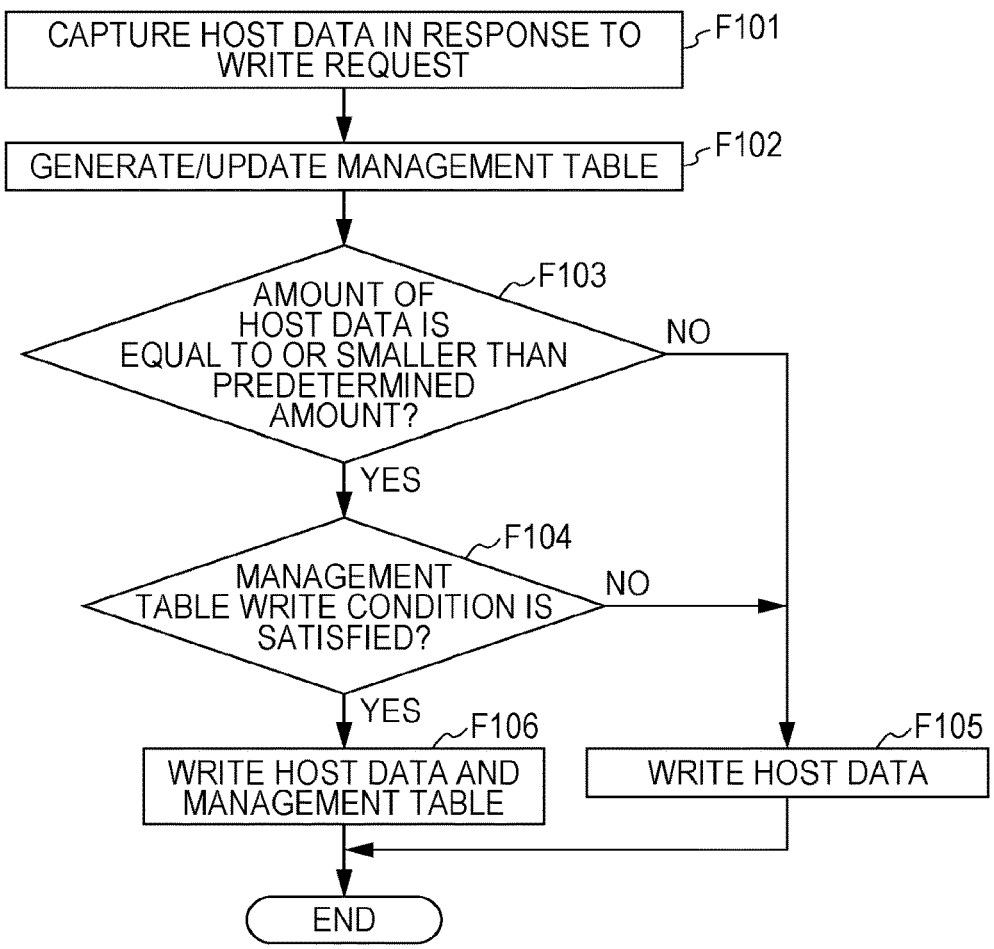
FIG. 4 is a flowchart of a process performed in data write according to the present embodiment.
Figure 5:
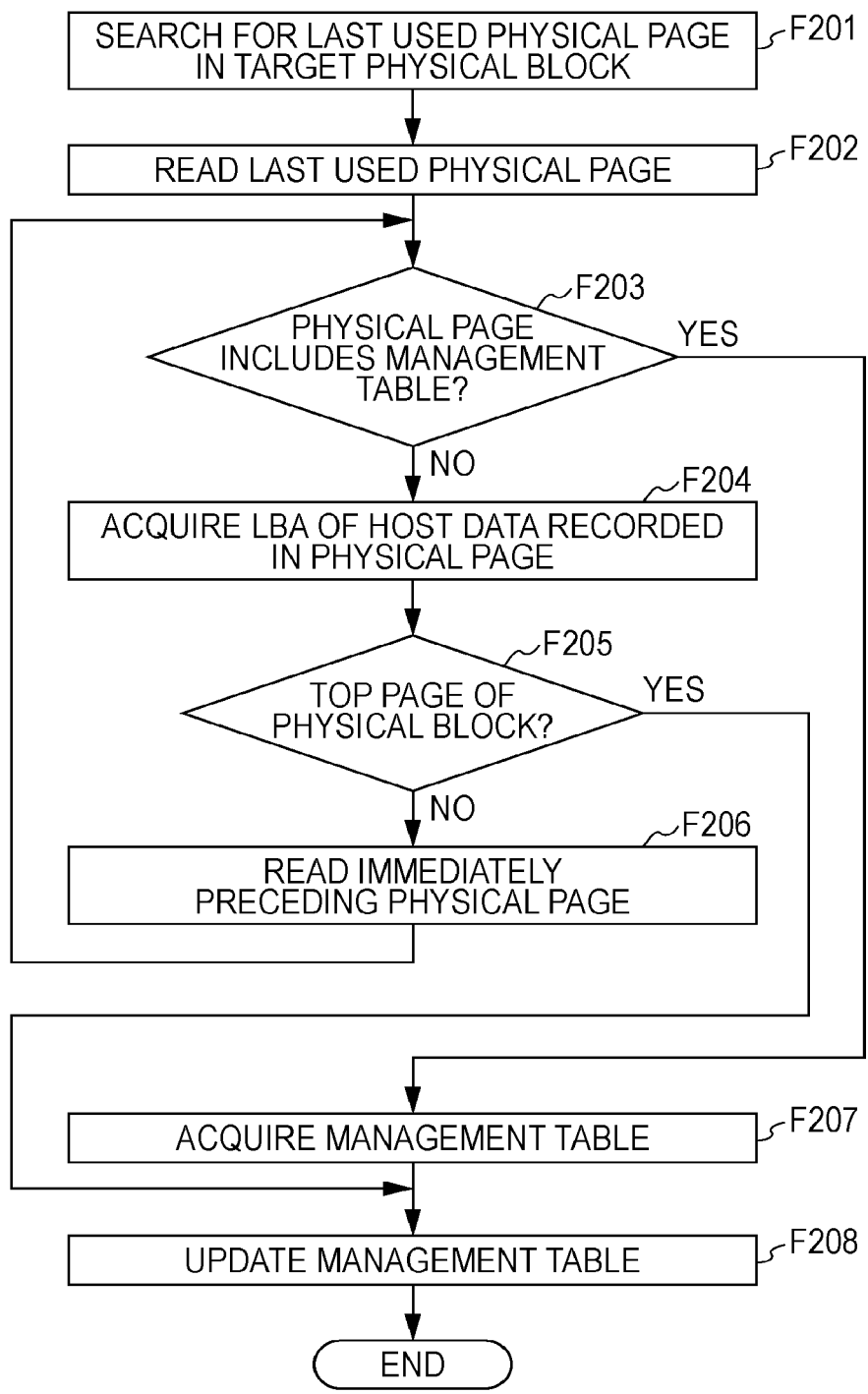
FIG. 5 is a flowchart of a management table construction process according to the present embodiment.

FIG. 4 shows an example of a control process that the control unit 11 performs to write host data to the non-volatile memory 15.

In step F101, the control unit 11 performs capture of host data to be written, acquisition of a logical block address, or the like in response to a data write request from the host device 2.

Specifically, the control unit 11 temporarily stores the host data sent by the host device 2 in the buffer RAM 14 via the device interface 13. The control unit 11 also grasps the logical block address and data amount of the host data to be written, from the write request command received via the device interface 13.

In step F102, the control unit 11 generates or updates a management table to cope with the current data write.

The control unit 11 writes the host data to a physical page PP subsequent to the last used physical page in a physical block PB. For this reason, the control unit 11 adds, to the then management table, logical-physical association data in which the logical block address of the host data and a physical page number to which the host data is to be written are associated with each other.

If a management table for the physical block PB to which the host data is to be written has yet to be constructed at this point in time, the control unit 11 constructs a management table by performing a process shown in FIG. 5 described below and then adds the above-mentioned logical-physical association data to the management table constructed.

Similarly, if the physical block PB to which the host data is to be written is an unused physical block PB, the control unit 11 newly generates a management table containing the above-mentioned logical-physical association data.

In step F103, the control unit 11 determines whether the amount of the host data is smaller than or equal to a predetermined amount.

This determination is as to whether the host data and the management table can be written together to a single physical page PP. Accordingly, the predetermined amount refers to a data amount such that it can be determined that even when the host data is written to the physical page PP, the physical page PP still has a capacity of incorporating the management table.

Assuming that a single physical page PP has a capacity of 16 Kbytes and that a management table has to use several Kbytes, the predetermined amount is set to, e.g., 8 Kbytes. The predetermined amount here does not have to be fixed data amount and may be a value obtained by subtracting the data size of the then management table from the capacity of the physical page PP.

If the amount of the host data exceeds the predetermined amount and therefore it is difficult to write the management table to the physical page PP, the control unit 11 proceeds to step F105 to control write of the host data. Specifically, the control unit 11 stores the host data temporarily stored in the buffer RAM 14, in the non-volatile memory 15 in accordance with the physical block address entered into the management table in step F102.

The control unit 11 then ends the process corresponding to the current write request.

If the amount of the host data is smaller than or equal to the predetermined amount and therefore the management table can be written to the physical page PP, the control unit 11 determines in step F104 whether a management table write condition is satisfied.

The management table write condition here is a condition other than the data size of host data, and various conditions are conceivable, including the following:

(a) If the data size is smaller than or equal to the predetermined amount, a management table is usually written (that is, there is no management table write condition other than the size);

(b) A management table is written once on m number of occasions when the data size is smaller than or equal to the predetermined amount;

(c) A management table is written when host data has been written m or more times since the last write of management table; and (d) A management table is written when logical block addresses become non-sequential in the physical block PB.

If the condition (a) (that is, no condition) is set, the management table write condition is satisfied in step F104 and therefore the control unit 11 proceeds to step F106. The control unit 11 then performs control such that the host data and the then management table are written to the same physical block PB.

For example, the control unit 11 stores the host data temporarily stored in the buffer RAM 14 and the latest management table stored in the internal RAM 12, in the non-volatile memory 15 in accordance with the physical block address entered in the management table in step F102.

The control unit 11 then ends the process corresponding to the write request.

Note that if one of the management table write conditions (b), (c), and (d) is set, there may be a case where the condition is not be satisfied. In this case, the control unit 11 controls write of the host data alone in step F105.

FIG. 5 shows a management table construction process performed by the control unit 11. The control unit 11 may perform the management table construction process shown in FIG. 5 either in step F102 of FIG. 4 or at any point in time.

First, in step F201, the control unit 11 searches for the last used page PPe of the target physical block PBx. The control unit 11 can search for the last used physical page PPe, for example, by binary search.

Since physical pages are sequentially used in the physical block PB, starting with the physical page PP0, the last used physical page PPe refers to a physical page PP to which data has been written most recently.

FIG. 6A shows a physical block PBx in which data has been written up to a physical page PP13 thus far. In the physical block PBx, physical pages PPs are sequentially used in the direction of an arrow. The physical page PP13 is the last used physical page PPe.

Binary search is, for example, a technique of searching for the last used physical page PPe while checking the central physical page PP. In FIG. 6A, a physical page PP7, for example, is checked first. If data has been already written to the physical page PP7, one of the physical pages PP7 to PP15 is the last used physical page PPe. The control unit 11 then checks the physical page PP11. If data has been already written to the physical page PP11, one of the physical pages PP11 to PP15 is the last used physical page PPe. The control unit 11 then checks the physical page PP13. As seen above, binary search is a technique of searching for the last used physical page PPe by narrowing down the physical pages PP while checking the central physical page PP.

When finding the last used physical page PPe, the control unit 11, in step F202, reads the last used physical page PPe and checks details of the stored data. In particular, the control unit 11 checks whether the last used physical page PPe contains a management table.

When the last used physical page PPe contains a management table, the control unit 11 proceeds from step F203 to step F207 and captures the management table to update it. In step F208, the control unit 11 updates the management table.

For example, a management table is represented by "MGT" in FIG. 6A, and the physical page PP13, which is the last used physical page PPe, contains management tables MGT.

In such a physical block PB, the control unit 11 captures the management tables MGT stored in the retrieved last used physical page PPe, as shown by an arrow MR in FIG. 6B.

The management tables MGT stored in the last used physical page PPe are the latest management tables which contain logical-physical association data with respect to all pieces of host data stored in the then physical block PBx.

Accordingly, in performing the process of FIG. 5 in step F102 of FIG. 4, the control unit 11, in step F208 of FIG. 5, only has to add, to the management table MGT, new logical-physical association data with respect to the logical block address of the host data to be written. For a data rewrite, the control unit 11 only has to rewrite the relevant logical-physical association data.

Here assume that the process of FIG. 5 is performed in a manner different from data write as shown in FIG. 4. If a management table MGT can be read from the last used physical page PPe, the control unit 11 does not have to add or update logical-physical association data in step F208, since the management table MGT is the latest one.

Note that the controller 11 does not have to perform the process of FIG. 5 each time the data write shown in FIG. 4 is performed. For example, assuming that power is on, if, each time a write request is made by the host device 2, a management table is generated or updated in step F102 in accordance with the data to be written, the latest management table is stored in the internal RAM 12.

That is, the process of FIG. 5 only has to be performed, for example, once when power is turned on.

Subsequently, the management table acquired in the process of FIG. 5 only has to be updated in data write. The latest management table only has to be stored in the physical page PP when possible.

If the last used physical page PPe contains no management table, the control unit 11 proceeds from step F203 to step F204 to check and store the logical block address LBA of host data stored in the physical page PP (in this case, the last used physical page PPe).

If the physical page PP is not the top physical page, PP0, of the target physical block PBx, the control unit 11 proceeds from step F205 to step F206 to read a physical page PP immediately preceding the physical page PP and, back in step F203, determines whether that physical page PP contains a management table MGT.

If the physical page PP contains no management table MGT, the control unit 11, in step F204, checks and stores the logical block address LBA of host data stored in the physical page PP. If the physical page PP is not the top physical page, PP0, of the target physical block PBx, the control unit 11 proceeds from step F205 to step F206 to read a physical page PP immediately preceding the physical page PP and, back in step F203, determines whether that physical page PP contains a management table MGT.

That is, the process of step F204→step F205→step F206→step F203 is a process of searching for a physical page PP containing a management table MGT while sequentially tracing preceding physical pages PP, starting with the last used physical page PPe, and storing the logical block address of host data stored in each physical page PP.

When the control unit 11 checks in this process that a physical page PP contains a management table, it proceeds from step F203 to step F207 to capture the management table MGT from that physical page PP to update the management table MGT. In step F208, the control unit 11 updates the management table.

For example, FIG. 6C shows that the physical page PP14 is the last used physical page PPe and contains no management table MGT.

In this case, the control unit 11 checks a physical page PP immediately preceding the last used physical page PPe, as shown by an arrow SC. In this example, management tables MGT are found in the immediately preceding physical page, PP13. Accordingly, the control unit 11 captures the management tables MGT from the physical page PP13, as shown by an arrow MR.

As seen above, a management table MGT stored in a physical page PP other than the last used physical page PPe does not contain logical-physical association data with respect to all pieces of host data stored in the then physical block PBx. For example, in the example shown in FIG. 6C, the captured management table MGT does not contain logical-physical association data with respect to the physical page PP14.

For this reason, in step F208, the management table MGT is updated to incorporate logical-physical association data with respect to the physical page PP14. Specifically, since the logical block address of host data stored in the physical page PP14 is stored in step F204, logical-physical association data in which the stored logical block address is associated with the physical page PP14 is added to the captured management table MGT.

Subsequently, in performing the process of FIG. 5 in step F102 of FIG. 4, new logical-physical association data with respect to the logical block address of the host data to be written only has to be added to the management table MGT. For a data rewrite, the relevant logical-physical association data only has to be rewritten.

Where the process of FIG. 5 is performed in a manner different from data write as shown in FIG. 4, the latest management table MGT is obtained at the point in time when pieces of logical-physical association data with respect to physical pages PP up to the last used physical page PPe (in this case, physical page PP14) are added.

If the physical page PP is determined to be the top physical page PP0 in step F205, any physical page PP of the physical block PBx does not contain a management table MGT.

In this case, the control unit 11 newly constructs a management table MGT in step F208.

Specifically, the control unit 11 generates the management table MGT by generating pieces of logical-physical association data with respect to the logical block addresses stored in step F204 with respect to physical pages PP from the last used physical page PPe to the top physical page PP0.

Where the process of FIG. 5 is performed in step F102 of FIG. 4, the control unit 11 adds, to the management table MGT generated, new logical-physical association data with respect to the logical block address of the host data to be written. For a data rewrite, the control unit 11 rewrites the relevant logical-physical association data.

Where the process of FIG. 5 is performed in a manner other than data write as shown in FIG. 4, the management table MGT generated is the latest management table.

The example process of the present embodiment has been described above. In this process, the control unit 11 first writes the management table to the physical page PP along with the host data.

In other words, if a write request is made and if host data is as small as, e.g., 4 Kbytes, the latest management table is stored into a physical page along with the host data.

Since the management table is stored in the physical page PP, the management table can be read as necessary by reading the physical page PP. Further, the management table can be stored at the same time that the host data is written.

Further, since the latest management table is written to a physical page PP when host data is sufficiently small to write, nearly the latest management table is usually stored in a non-volatile manner. If it is desired to grasp the management table, for example, when power is turned on, the control unit 11 can acquire the latest management table in many cases by performing the process of FIG. 5, without having to read all physical pages PP of the target physical block PB. For example, cases as shown in FIG. 6B or FIG. 6C often occur.

Accordingly, the process of acquiring the latest management table can also be performed quickly.

Thus, even when write of small-size host data is requested by the host device 2 or when write of host data having a non-sequential logical block address is frequently requested by the host device 2, it is possible to quickly construct, in a physical block PB, a management table which is necessary for logical-to-physical block address conversion. As a result, access speed can be increased.

Further, since host data from the host device 2 and a management table are written to the same physical page PP, the possibility that a discrepancy may occur between the real internal state of the physical block PB and the management table is reduced. Accordingly, the reliability of data can be increased even when an abnormal situation occurs, for example, when power is shut off halfway.

4. Management Table Write Occasion

Occasions when a management table is written in the process of the present embodiment will be described. The management table write conditions (a), (b), (c), and (d) have been described above as examples.

If the management table write condition (a) is set, that is, if a management table is usually (unconditionally) written when data size is smaller than or equal to the predetermined amount, a management table write operation is performed as shown in FIG. 7.

For example, write of pieces of host data having logical block addresses "1" and "2" are requested at a certain point in time. Here assume that management tables can be written in terms of size. Subsequently, the pieces of host data and management tables MGT are written to, for example, the physical page PP0, as shown by an arrow DMW in FIG. 7A.

Subsequently, write of pieces of host data having logical block addresses "3" and "4" is requested. Similarly assume that management tables can be written in terms of size. Subsequently, the pieces of host data and management tables MGT are written to, for example, the physical page PP1, as shown by an arrow DMW in FIG. 7B.

Subsequently, write of pieces of small-size host data is similarly requested, and the pieces of host data and management tables are written to the physical pages PP2 and PP3, as shown by arrows DMW in FIGS. 7C and 7D.

When write of pieces of host data having logical block addresses "9", "10", "11", and "12" whose data size is not smaller than or equal to the predetermined amount is requested, the pieces of host data are written to the physical page PP4 but no management table MGT is written thereto, as shown by an arrow DW.

As seen above, an example process is conceivable in which if the size of host data related to a single write request is smaller than or equal to the predetermined amount, a management table is unconditionally written along with the host data.

If the management table write condition (b) is set, that is, if a management table is written once on m number of occasions when data size is smaller than or equal to the predetermined amount, a management table write operation is performed as shown in FIG. 8.

For example, assume that a management table is written once on five occasions.

FIG. 8A shows a case in which five requests to write small-size host data are made, including the first write request (pieces of host data having logical block addresses "1" and "2"), the second write request (pieces of host data having logical block addresses "3" and "4"), . . . and the fifth write request (pieces of host data having logical block addresses "9" and "10"). When the first to fourth write requests are made, a management table can be written in terms of the size of the host data. However, the management table write condition is determined not to be satisfied in step F104 of FIG. 4, and no management table is written. When the fifth write request is made, the management table write condition is determined to be satisfied in step F104 of FIG. 4. Accordingly, management tables MGT are written along with the host data in step F106, as shown by an arrow DMW in FIG. 8A.

Even when requests to write small-size host data, such as the sixth to ninth write requests, are subsequently continuously made, no management table is written, as shown in FIGS. 8B and 8C. When the tenth write request is made, the once-on-five occasions condition is determined to be satisfied, and management tables MGT are written along with the host data, as shown by an arrow DMW in FIG. 8D.

Of course, "m" in "once on m number of occasions" can be set to any value.

Further, if a request to write large-size host data is made, that is, if a request to write host data whose size is determined to exceed the predetermined amount in step F103 of FIG. 4 is made, this occasion may or may not be included in the m number of occasions.

A case where an occasion when a request to write host data whose size exceeds the predetermined amount is included in the m number of occasions is equivalent to the management table write condition (c) that a management table is written when host data has been written m or more times since the last write to a management table.

If the management table write condition (d) is set, that is, a management table is written when logical block addresses become non-sequential in the physical block PB, a management table write operation is performed as shown in FIG. 9A to 9C.

FIGS. 9A and 9B show a case in which five requests to write small-size host data are made, including the first write request (pieces of host data having logical block addresses "1" and "2"), the second write request (pieces of host data having logical block addresses "3" and "4"), . . . and the fifth write request (pieces of host data having logical block addresses "9" and "10").

Note that in these cases, the logical block addresses stored in the physical pages PP are sequential. When the first to fifth write requests are made, the logical block addresses are sequential and therefore a management table can be written in terms of the size of the host data. However, the management table write condition is determined not be satisfied in step F104 of FIG. 4, and no management table is written.

Assume that a request to write pieces of host data having logical block addresses "21" and "22" is subsequently made as the sixth write request. While these pieces of host data are written to the subsequent physical page, PP5, the logical block addresses become non-sequential. In this case, the management table write condition is determined to be satisfied in step F104 of FIG. 4, and management tables MGT are written along with the pieces of host data in step F106, as shown by an arrow DMW in FIG. 9C.

As seen above, even when the size of host data is smaller than or equal to the predetermined amount and therefore a management table can be written to the physical page PP, example processes where various write conditions are set, as shown in FIGS. 8A to 8D and 9A to 9C, are conceivable in addition to an example process where a management table is usually written as shown in FIGS. 7A to 7E. Of course, the above examples are not limiting. For example, it is considered to determine whether to write a management table, under the AND/OR condition of the condition (b) or condition (c), and the condition (d).

Depending on the setting of the write condition, the management table may be stored more efficiently.

5. Modifications

While the present embodiment has been described, various modifications of the configuration or process of the present embodiment are conceivable.

For example, in writing host data and a management table to the same physical page PP in step F106 of FIG. 4, the physical page PP may be a physical page PP in a physical block, PBy, other than the physical block PBx which has been used thus far.

Further, the physical block PBy may be, for example, a dedicated physical block PBy that provides physical pages PP containing a management table.

In such a case, it is appropriate that the management table have the structure shown in FIG. 3C.

While the memory card 1 is used as an example in the present embodiment, the present disclosure is applicable to a case where the non-volatile memory 15 and the control unit 11 are separate components.

The present disclosure is applicable to various types of memory cards, SSD, eMMC, and the like.

The present disclosure may be configured as follows:

(1) A control device including: a management information generation unit configured to generate or update logical-physical block address management information with respect to either data to be written to a non-volatile memory or data which has been already written in the non-volatile memory, the logical-physical block address management information indicating association between a logical block address and a physical block address on the non-volatile memory; and an access control unit configured to, during write of the data to the non-volatile memory, control write of the data as well as the logical-physical block address management information to a physical write unit of the non-volatile memory.

(2) The control device according to (1), wherein when a combined data amount of the data to be written and the logical-physical block address management information falls within a capacity of the physical write unit, the access control unit controls write of the data and the logical-physical block address management information to the physical write unit of the non-volatile memory.

(3) The control device according to one of (1) and (2), wherein when a combined data amount of the data to be written and the logical-physical block address management information falls within a capacity of the physical write unit and when a predetermined management information write condition is satisfied, the access control unit controls write of the data and the logical-physical block address management information to the physical write unit of the non-volatile memory.

(4) The control device according to (3), wherein the management information write condition is a condition as to the number of occasions when write has been performed since the last write of the logical-physical block address management information.

(5) The control device according to one of (3) and (4), wherein the management information write condition is a condition as to sequence of logical block addresses of pieces of data which are physically sequentially written on the non-volatile memory.

(6) The control device according to one of (1) to (5), wherein the physical write unit includes a plurality of physical write units, and the physical write units form a physical erase unit in the non-volatile memory, wherein the access control unit sequentially checks the physical write units in the physical erase unit as to whether each physical write unit contains the logical-physical block address management information, starting with the last used physical write unit toward the top physical write unit, and acquires the logical-physical block address management information which has been first found, and wherein the management information generation unit updates the logical-physical block address management information using the logical-physical block address management information acquired by the access control unit and logical block address information of a physical write unit containing no logical-physical block address management information.

(7) The control device according to one of (1) to (6), wherein the non-volatile memory is a NAND flash memory where a plurality of physical pages form a physical block serving as an erase unit, and wherein the physical pages are the physical write units.

It should be understood that various changes and modifications to the presently preferred embodiments described herein will be apparent to those skilled in the art. Such changes and modifications can be made without departing from the spirit and scope of the present subject matter and The invention is claimed as follows:

1. A storage device comprising:
non-volatile memory having physical storage accessible with physical block addresses, each address composed of at least a physical block and a physical page where multiple physical pages form a physical block, wherein (i) each physical block is associated with a physical unit of the non-volatile memory having a determinable storage capacity, (ii) each physical block address is accessible by specifying a logical block address composed of at least a logical block and a logical page, and (iii) each logical block address is convertible into an associated physical block address;
a control unit configured to interface between the non-volatile memory and a host in order to effect access of data stored in the non-volatile memory for transfer to the host and writing of host data received from the host into the non-volatile memory, the control unit including a management information generation unit and an access control unit,
the management information generation unit configured to generate or update logical-physical block address management information data, including associations between logical block addresses and a physical block addresses, with respect to data to be written to the non-volatile memory or data which has been already written into the non-volatile memory; and
the access control unit configured to (i) control writing of an amount of host data to the non-volatile memory, (ii) determine whether the amount of host data combined with the associated logical-physical block address management information data exceeds the storage capacity of the associated physical unit of the non-volatile memory, and (iii) when said combined data exceeds said storage capacity, only allow writing the amount of host data to said associated physical unit without writing the associated logical-physical block address management information data to said associated physical unit and (iv) when said combined data does not exceed said storage capacity, allow writing said combined data to said associated physical unit.

2. The control device according to claim 1 wherein, when said combined data does not exceed said storage capacity of the physical unit of the non-volatile memory, the access control unit allows writing said combined data to said associated physical unit only when a predetermined management information write condition is satisfied.

3. The control device according to claim 2 wherein, when there has been a previous and most recent write of the logical-physical block address management information to the physical write unit of the non-volatile memory, the management information write condition requires a predetermined number of host data write occurrences subsequent to the most recent write of the logical-physical block address management information.

4. The control device according to claim 2, wherein the management information write condition requires a sequence of logical block addresses of pieces of data which are physically sequentially written into the non-volatile memory.

5. The control device according to claim 1, wherein the non-volatile memory is a NAND flash memory where a plurality of physical pages form a physical block serving as an erase unit, and wherein the physical pages are the physical write units.

6. The storage device of claim 1 where the control unit is configured to perform management table construction according to a method comprising:
searching for a last-used physical page $PP_e$ in a target physical block comprising a sequence of physical pages $PP_0$ to $PP_n$ by determining whether data has been written to a first page in an intermediate portion of the sequence and, if data has been written to the first page, then checking a second page intermediate the first page and the page $PP_n$ to determine whether data has been written to the second page; and
determining whether the last used physical page $PP_e$ contains a management table.

7. The storage device of claim 6 further including, when the last used physical page $PP_e$ contains a management table, updating the management table but, if last used physical page $PP_e$ does not contain a management table, storing the logical block address of the associated host data in the last used physical page $PP_e$.

8. A control method for data storage in non-volatile memory having physical storage accessible with physical block addresses, each address composed of at least a physical block and a physical page where multiple physical pages form a physical block, wherein (i) each physical block is associated with a physical unit of the non-volatile memory having a determinable storage capacity, (ii) each physical block address is accessible by specifying a logical block address composed of at least a logical block and a logical page, and (iii) each logical block address is convertible into an associated physical block address, the method comprising:
generating or updating logical-physical block address management information with respect to either data to be written non-volatile memory or data which has been already written in the non-volatile memory, the logical-physical block address management information indicating association between a logical block address and a physical block address on the non-volatile memory;
during write of host data to the non-volatile memory, determining whether an amount of the host data exceeds a predetermined amount, wherein the predetermined amount is a data amount such that it can be determined that, when the host data is to be written to a physical write unit of the non-volatile memory, the physical write unit of the non-volatile memory will still have available capacity to incorporate the logical-physical block address management information; and
after determining that the amount of the host data exceeds the predetermined amount, permitting write of the host data to the physical write unit of the non-volatile memory, but not permitting write of the logical-physical block address management information to the physical write unit of the non-volatile memory, the method further including performance management table construction by:
searching for a last-used physical page $PP_e$ in a target physical block comprising a sequence of physical pages $PP_0$ to $PP_n$ by determining whether data has been written to a first page in an intermediate portion of the sequence and, if data has been written to the first page, then checking a second page intermediate the first page and the page $PP_n$ to determine whether data has been written to the second page; and determining whether the last used physical page $PP_e$ contains a management table.

9. The method of claim 8 further including, when the last used physical page $PP_e$ contains a management table, updating the management table and, if the last used physical page $PP_e$ does not contain a management table, storing the logical block address of the associated host data in the last used physical page $PP_e$.

* * * * *